(12) United States Patent
Lubsey et al.

(10) Patent No.: US 11,226,846 B2
(45) Date of Patent: *Jan. 18, 2022

(54) SYSTEMS AND METHODS OF HOST-AWARE RESOURCE MANAGEMENT INVOLVING CLUSTER-BASED RESOURCE POOLS

(71) Applicant: Virtustream IP Holding Company LLC, Bethesda, MD (US)

(72) Inventors: Vincent G. Lubsey, Snellville, GA (US); Kevin D. Reid, Bethesda, MD (US); Karl J. Simpson, Rockville, MD (US); Rodney John Rogers, Weston, FL (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 323 days.

This patent is subject to a terminal disclaimer.

(21) Appl. No.: 16/403,264

(22) Filed: May 3, 2019

(65) Prior Publication Data
US 2019/0258506 A1 Aug. 22, 2019

Related U.S. Application Data

(63) Continuation of application No. 15/357,758, filed on Nov. 21, 2016, now Pat. No. 10,331,469, which is a
(Continued)

(51) Int. Cl.
*G06F 9/455* (2018.01)
*G06F 9/50* (2006.01)

(52) U.S. Cl.
CPC ........ *G06F 9/5072* (2013.01); *G06F 9/45558* (2013.01); *G06F 9/5011* (2013.01);
(Continued)

(58) Field of Classification Search
CPC .. G06F 9/5072; G06F 9/45558; G06F 9/5011; G06F 2009/4557;
(Continued)

(56) References Cited

U.S. PATENT DOCUMENTS 7,194,616 B2  3/2007 Axnix et al.
7,664,110 B1  2/2010 Lovett et al.
(Continued)

FOREIGN PATENT DOCUMENTS

CN  1333508 A   1/2002
EP  1170662 A2  1/2002
(Continued)

OTHER PUBLICATIONS

Chinese Office Action issued in CN 201180020269.0 dated Dec. 1, 2015 with English Language Translation.
(Continued)

*Primary Examiner* — Bradley A Teets
(74) *Attorney, Agent, or Firm* — Ryan, Mason & Lewis, LLP

(57) ABSTRACT

Systems and methods are disclosed for managing resources associated with cluster-based resource pool(s). According to illustrative implementations, innovations herein may include or involve one or more of best fit algorithms, infrastructure based service provision, tolerance and/or ghost processing features, dynamic management service having monitoring and/or decision process features, as well as virtual machine and resource distribution features.

20 Claims, 15 Drawing Sheets

Related U.S. Application Data continuation of application No. 14/318,251, filed on Jun. 27, 2014, now Pat. No. 9,535,752, which is a continuation-in-part of application No. 13/595,955, filed on Aug. 27, 2012, now Pat. No. 8,799,920.

(60) Provisional application No. 61/527,472, filed on Aug. 25, 2011.

(52) U.S. Cl.
CPC ............ *G06F 2009/4557* (2013.01); *G06F 2009/45583* (2013.01); *G06F 2009/45595* (2013.01); *G06F 2209/5011* (2013.01)

(58) Field of Classification Search
CPC . G06F 2009/45583; G06F 2009/45595; G06F 2209/5011
USPC .................................................. 718/1
See application file for complete search history.

(56) References Cited

U.S. PATENT DOCUMENTS

| | | |
|---|---|---|
| 7,908,605 B1 | 3/2011 | Graupner et al. |
| 7,941,804 B1 | 5/2011 | Herington et al. |
| 8,219,712 B2 | 7/2012 | Riddoch et al. |
| 8,219,769 B1 | 7/2012 | Wilk |
| 8,234,650 B1 | 7/2012 | Eppstein et al. |
| 8,359,594 B1 | 1/2013 | Davidson et al. |
| 8,484,355 B1 | 7/2013 | Lochhead et al. |
| 8,555,274 B1 | 10/2013 | Chawla et al. |
| 8,650,299 B1 | 2/2014 | Huang et al. |
| 8,738,333 B1 | 5/2014 | Behera et al. |
| 8,799,920 B2 | 8/2014 | Lubsey et al. |
| 8,856,334 B2 | 10/2014 | Sonoda et al. |
| 9,535,752 B2 | 1/2017 | Lubsey et al. |
| 10,331,469 B2 * | 6/2019 | Lubsey ............... G06F 9/5072 |
| 2002/0059427 A1 | 5/2002 | Tamaki et al. |
| 2002/0161869 A1 | 10/2002 | Griffin et al. |
| 2002/0184363 A1 | 12/2002 | Viavant et al. |
| 2003/0028642 A1 | 2/2003 | Agarwal et al. |
| 2004/0003063 A1 | 1/2004 | Ashok et al. |
| 2004/0111509 A1 | 6/2004 | Eilam et al. |
| 2004/0267897 A1 | 12/2004 | Hill et al. |
| 2005/0039183 A1 | 2/2005 | Romero et al. |
| 2005/0102674 A1 | 5/2005 | Tameshige et al. |
| 2005/0108712 A1 | 5/2005 | Goyal |
| 2005/0120160 A1 | 6/2005 | Plouffe et al. |
| 2005/0165925 A1 | 7/2005 | Dan et al. |
| 2005/0235286 A1 | 10/2005 | Ballew et al. |
| 2006/0056618 A1 | 3/2006 | Aggarwal et al. |
| 2006/0069594 A1 | 3/2006 | Yamasaki |
| 2006/0101224 A1 | 5/2006 | Shah et al. |
| 2006/0143617 A1 | 6/2006 | Knauerhase et al. |
| 2006/0161988 A1 | 7/2006 | Costea et al. |
| 2006/0190606 A1 | 8/2006 | Kohavi |
| 2006/0259818 A1 | 11/2006 | Howell et al. |
| 2007/0106796 A1 | 5/2007 | Kudo et al. |
| 2007/0106798 A1 | 5/2007 | Masumitsu et al. |
| 2007/0115924 A1 | 5/2007 | Schneider et al. |
| 2007/0118567 A1 | 5/2007 | Isokawa |
| 2007/0250929 A1 | 10/2007 | Herington et al. |
| 2007/0266433 A1 | 11/2007 | Moore |
| 2007/0271560 A1 | 11/2007 | Wahlert et al. |
| 2008/0082977 A1 | 4/2008 | Araujo et al. |
| 2008/0109549 A1 | 5/2008 | Nakagawa et al. |
| 2008/0163194 A1 | 7/2008 | Dias et al. |
| 2008/0163239 A1 | 7/2008 | Sugumar et al. |
| 2008/0183544 A1 | 7/2008 | Matsumitsu et al. |
| 2008/0189468 A1 | 8/2008 | Schmidt et al. |
| 2008/0189510 A1 | 8/2008 | Riddoch et al. |
| 2008/0189700 A1 | 8/2008 | Schmidt et al. |
| 2008/0263258 A1 | 10/2008 | Allwell et al. |
| 2008/0295096 A1 | 11/2008 | Beaty et al. |
| 2009/0012132 A1 | 1/2009 | Nonomura |
| 2009/0106409 A1 | 4/2009 | Murata |
| 2009/0138887 A1 | 5/2009 | Uehara et al. |
| 2009/0199198 A1 | 8/2009 | Horii et al. |
| 2009/0254572 A1 | 10/2009 | Redlich et al. |
| 2009/0276771 A1 | 11/2009 | Nickolov et al. |
| 2009/0288084 A1 | 11/2009 | Astete et al. |
| 2009/0293022 A1 | 11/2009 | Fries |
| 2010/0070784 A1 | 3/2010 | Gupta et al. |
| 2010/0107172 A1 | 4/2010 | Calinescu et al. |
| 2010/0125845 A1 | 5/2010 | Sugumar et al. |
| 2010/0241751 A1 | 9/2010 | Sonoda et al. |
| 2010/0242045 A1 | 9/2010 | Swamy et al. |
| 2011/0093852 A1 | 4/2011 | Li et al. |
| 2011/0119670 A1 | 5/2011 | Sugumar et al. |
| 2011/0131335 A1 | 6/2011 | Spaltro et al. |
| 2011/0131589 A1 | 6/2011 | Beaty et al. |
| 2011/0173637 A1 | 7/2011 | Brandwine et al. |
| 2011/0185064 A1 | 7/2011 | Head et al. |
| 2011/0209147 A1 * | 8/2011 | Box .................. G06F 9/5027 718/1 |
| 2011/0239215 A1 | 9/2011 | Sugai |
| 2012/0017114 A1 | 1/2012 | Timashev et al. |
| 2012/0110328 A1 | 5/2012 | Pate et al. |
| 2012/0110592 A1 | 5/2012 | Shah et al. |
| 2012/0174097 A1 | 7/2012 | Levin |
| 2012/0179824 A1 | 7/2012 | Jackson |
| 2013/0007506 A1 | 1/2013 | Jain et al. |
| 2013/0042087 A1 | 2/2013 | Shah et al. |
| 2013/0346995 A1 | 12/2013 | Jackson |

FOREIGN PATENT DOCUMENTS

| | | | |
|---|---|---|---|
| EP | 2040176 A1 | 3/2009 | |
| WO | 2009012132 A1 | 1/2009 | |
| WO | 2009072186 A1 | 6/2009 | |
| WO | WO-2010045744 A1 * | 4/2010 | .......... G06F 11/3409 |

OTHER PUBLICATIONS

Chinese Office Action issued in CN 201180020260.X dated Dec. 1, 2015.
U.S. Appl. No. 14/812,817.
English Language Abstract and Machine Translation of CN 1333508 published on Jan. 30, 2002.
Chinese Office Action issued in CN 201180020260.X dated May 15, 2015 with English Language Translation.
Chinese Office Action issued in CN 201180020260.X dated May 15, 2015.
English Language Translation for Chinese Office Action issued in CN 201180020260.X dated May 15, 2015.
Chinese Office Action issued in CN 201180020269.0 dated May 7, 2015.
English Language Translation for Chinese Office Action issued in CN 201180020269.0 dated May 7, 2015.
Supplemental European Search Report issued in EP 12826290.4 dated May 7, 2015.
International Search Report and Written Opinion issued in PCT/US2011/025392 dated Jun. 2, 2011.
U.S. Appl. No. 12/709,954.
International Search Report issued in PCT/US2011/025390 dated Jun. 1, 2011.
International Preliminary Report on Patentability and Written Opinion issued in PCT/US2011/025390 dated Aug. 27, 2012.
U.S. Appl. No. 12/709,943.
International Search Report issued in PCT/US2011/025393 dated Jun. 2, 2011.
International Preliminary Report on Patentability issued in PCT/US2011/025393 dated Aug. 27, 2012.
U.S. Appl. No. 12/709,962.
U.S. Appl. No. 13/595,955.
Chinese Office Action issued in CN 201180020269.0 dated Oct. 20, 2014.
English Language Translation of Chinese Office Action issued in CN 201180020269.0 dated Oct. 20, 2014.

(56) References Cited

OTHER PUBLICATIONS

Chinese Office Action issued in CN 201180020127.4 dated Feb. 15, 2015.
English Language Translation of Chinese Office Action issued in CN 201180020127.4 dated Feb. 15, 2015.
Extended Search Report issued in EP 11745299.5 dated Apr. 1, 2015.
Wei Zheng et al., "JustRunIt: Experiment-Based Management of Virtualized Data Centers", USENIX, May 12, 2009, pp. 1-16.
Josef Spillner et al., "Towards Unified Service Hosting", ICSOFT (2), Jul. 29, 2009, pp. 31-36.
Tim Souder et al., "A Tool for Security Integrating Legacy Systems into a Distributed Environment", Sixth Working Conference on Reverse Engineering: Proceedings: Oct. 6-8, 1999, Atlanta, Georgia, USA, pp. 47-55.
Extended Search Report issued in EP 11745300.1 dated Mar. 31, 2015.
Ming Zhao, "Experimental Study of Virtual Machine Migration in Support of Reservation of Cluster Resources", Virtualization Technology in Distributed Computing (VTDC), 2007 Second International Workshop on, ACM, Piscatway, NJ, USA, Nov. 12, 2007, pp. 1-8.
Timothy Wood et al., "Black-box and Grey-box Strategies for Virtual Machine Migration", NSDI '07: 4th USENIX Symposium on Network Systems Design & Implementation, Apr. 1, 2007, pp. 229-242.
Extended Search Report issued in EP 11745297.9 dated Mar. 31, 2015.
Norman Bobroff et al., "Dynamic Placement of Virtual Machines for Managing SLA Violations", 10th IFIP/IEEE International Symposium On Integrated Network Management, 2007. IM '07, May 1, 2007, pp. 119-128.

* cited by examiner

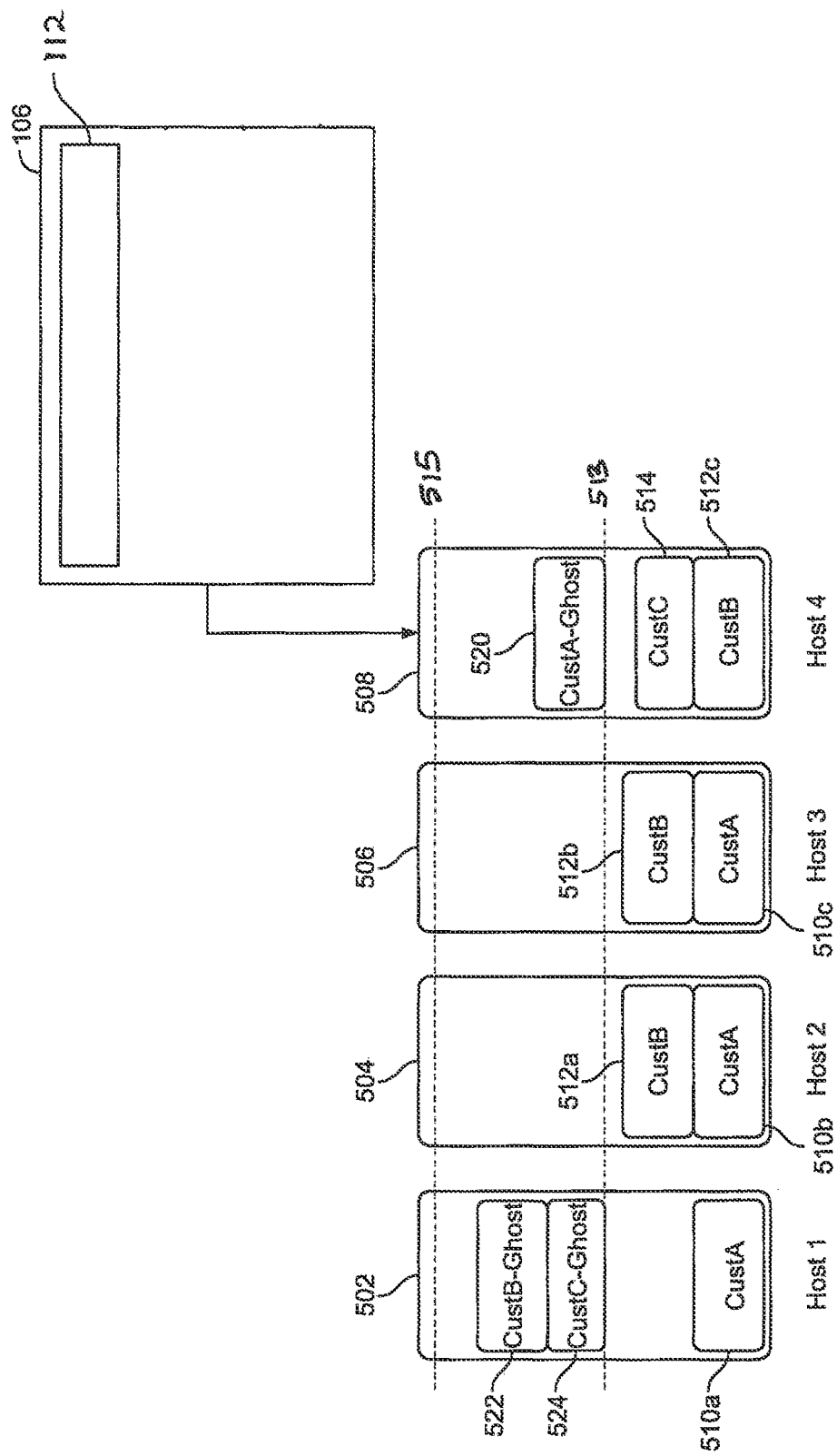

SYSTEMS AND METHODS OF HOST-AWARE RESOURCE MANAGEMENT INVOLVING CLUSTER-BASED RESOURCE POOLS

CROSS REFERENCE TO RELATED APPLICATION INFORMATION

This application is a continuation of U.S. patent application Ser. No. 15/357,758 filed on Nov. 21, 2016, which is a continuation of U.S. patent application Ser. No. 14/318,251 filed on Jun. 27, 2014, and now issued as U.S. Pat. No. 9,535,752 on Jan. 3, 2017, which is a continuation-in-part of U.S. patent application Ser. No. 13/595,955 filed Aug. 27, 2012, and now issued as U.S. Pat. No. 8,799,920 on Aug. 5, 2014. U.S. patent application Ser. No. 13/595,955 is based on and derives the benefit of the filing date of U.S. provisional patent application No. 61/527,472, filed Aug. 25, 2011, the contents of the entirety of which are incorporated herein by reference. Attached as an Appendix to this application is United States Published Application No. 2011-0209147, U.S. application Ser. No. 12/709,962, filed Feb. 22, 2011, the entire contents of which are also incorporated herein by reference.

BRIEF DESCRIPTION OF THE FIGURES

The accompanying drawings, which constitute a part of this specification, illustrate various implementations and aspects of the present invention and, together with the description, explain the principles of the invention. In the drawings:

FIG. 5 is a diagram illustrating exemplary aspects of resource management spacing and ghost features according to a disclosed implementation.

DETAILED DESCRIPTION OF ILLUSTRATIVE IMPLEMENTATIONS

Reference will now be made in detail to the inventions herein, examples of which are illustrated in the accompanying drawings. The implementations set forth in the following description do not represent all implementations consistent with the claimed inventions. Instead, they are merely some examples consistent with certain aspects related to the present innovations. Wherever possible, the same reference numbers will be used throughout the drawings to refer to the same or like parts.

Figure 1A:
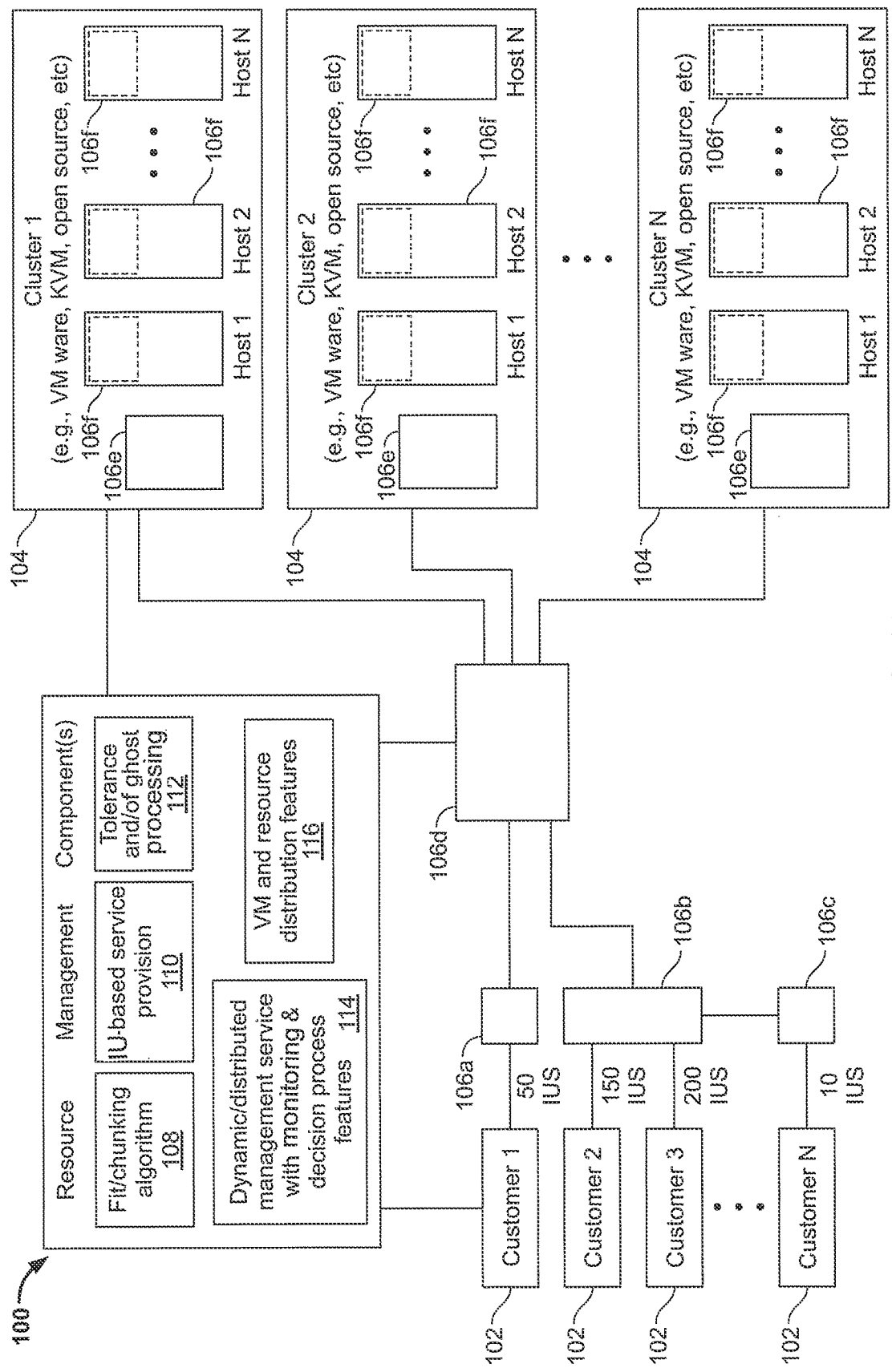
FIGS. 1A-1C are block diagrams of illustrative systems and aspects of resource management associated with cluster-based resource pools according to disclosed implementations.
Figure 1B:
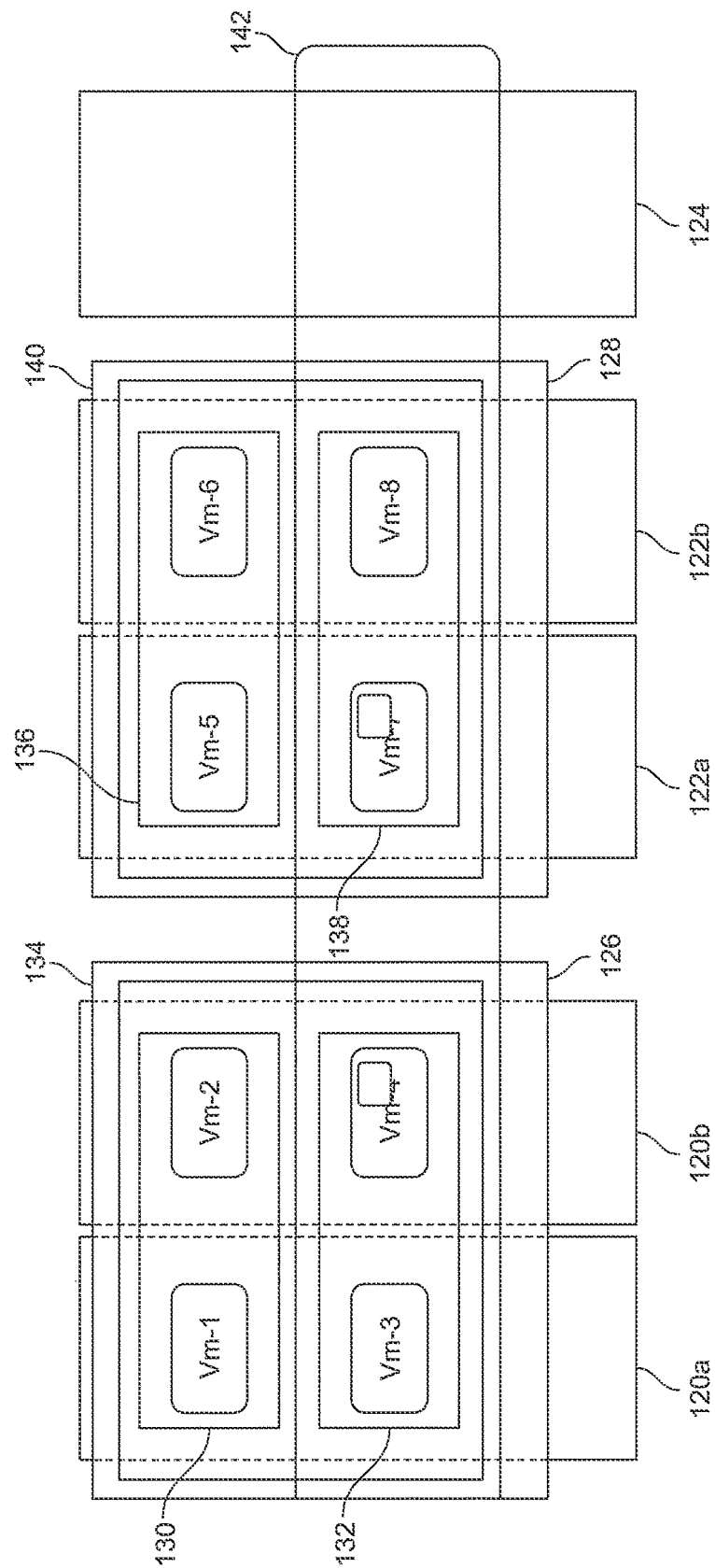
Figure 1C:
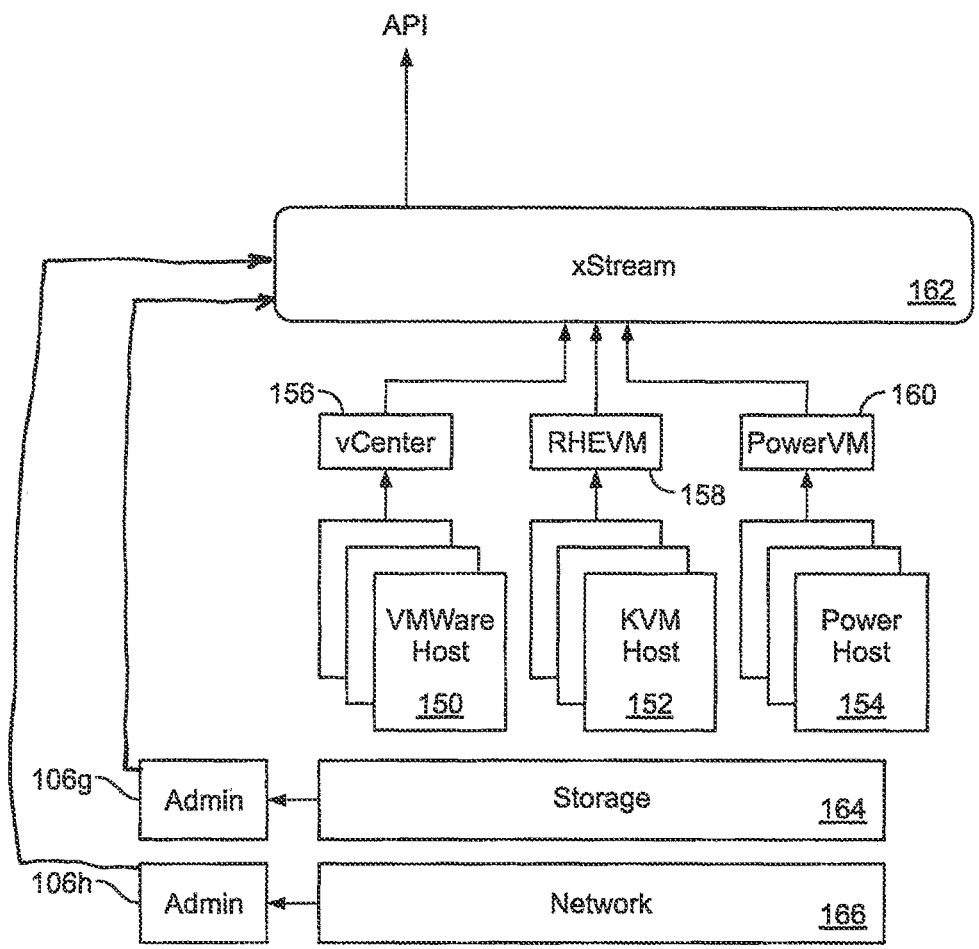

FIGS. 1A-1C are block diagrams of illustrative systems and aspects of resource management associated with cluster-based resource pools according to disclosed implementations. Here, for example, the implementations of FIGS. 1A-1C and elsewhere herein may be implemented in a cloud computing arrangement, i.e., with the various clusters physically present at differing/distributed locations throughout the cloud. Referring to FIG. 1A, a system 100 of managing resources of customers 102 across a variety of clusters 104 is shown. As set forth in more detail elsewhere, a determination of the resource needs of customers may be performed, yielding a specified quantity of infrastructure units (IUs) for each customer. As shown in illustration of FIG. 1A, for example, a first customer Customer 1 may require 50 infrastructure units (IUs), a second customer Customer 2 may require 150 IUs, a third customer Customer 3 may require 200 IUs, a Nth customer Customer N may require 10 IUs, and so on. A customer's infrastructure can be accessed to evaluate its cloud requirements using, for example, the Virtustream Advisor product. Customer infrastructure can also be accessed using other products to obtain, for example, capacity planner results or perfmon type statistics. Such assessment information may then be used to define the customer's resource pool requirements within a server farm, and resources can be apportioned appropriately.

Once defined, the customer infrastructure units may then be apportioned and otherwise managed by one or more resource management components 106. Resource management components 106 may be distributed in various different locations and/or arranged in a variety of configurations, such as those set forth herein. Here, for example, resource management processing may occur in one or more components 106a-106f set forth in FIG. 1A. The resource management may be performed via components involved with the customers 106a, 106b, 106c, via components associated with the clusters 106e, 106f, and/or via disparate components 106d. Within the clusters, resource management may occur on the hosts 106f or via other components 106e associated with the clusters. As shown in FIG. 1A, aspects of the innovations herein are configured for use across all manner of clusters 104, such as VMware clusters, kernel-based virtual machine (KVM) clusters, or other clusters of either open source or proprietary nature.

Turning to some of the illustrative resource management components in FIG. 1A, systems and methods herein may involve one or more innovative aspects such as best fit/chunking algorithms 108, IU-based service provision 110, tolerance and/or ghost processing 112, dynamic/distributed management service with monitoring and decision process features 114 and/or virtual machine (VM) and resource distribution features 116. At 108, for example, assessment information associated with customer requirements may be processed via a defined resource algorithm, such as a best fit algorithm, to define an appropriate resource pool separation or "chunking" strategy within a pool of resources. Additionally, via monitoring of such "chunks," hot spots or reallocation of resource distribution can be managed by a monitoring application portion of the dynamic/distributed management service 114 (also referred to a monitoring service or process). Resource management may also involve tolerance and/or ghost processing features 112, including definition of a customer "Ghost Chunk" to allow for resilience within the cluster, explained below.

As set forth in more detail below, various best fit/chunking algorithms 108 herein may involve obtaining or understanding a customer's resource needs as well as determining best allocations of associated virtual machines (VMs) across available clusters and hosts. To begin, basic customer resource needs may be assessed and gathered, and this process may also involve the use of known and accepted methods. According to implementations herein, customer resource requirements may then be established as a quantity of universal Infrastructure Units (IUs). Further, the scope and requirements of such IUs may be calculated as a function of analysis of clusters configured to hold customer data, wherein the analysis may include performing infrastructure speed testing and/or VM memory map sizing of hosts. Moreover, as explained below, such customer resources may then be processed through a decision method or algorithm to define the number and size of resource pools to be utilized for the customer.

Turning to FIG. 1B, an illustrative structure and interrelationship of hosts 120a, 120b, 122a, 122b, 124, cluster pools 126, 128, resource pools 134, 140, virtual pools 142 and virtual machines (VMs) is disclosed. FIG. 1B depicts a plurality of differing cluster groups, such as an ESX cluster (hosts 120a, 120b), a KVM cluster (hosts 122a, 122b) and a PVM host (124), in which cluster pools 126, 128, and resource pools 134, 140 may be defined. Virtual machines (VM-1 to VM-8) may be assigned to any of these pools and virtual pools 142 may be established or assigned across the clusters. According to the innovations herein, appropriate resource pool separation "chunking" strategies may be implemented across a pool of hypervisors such as a pool of open source hypervisors like kernel-based virtual machine (KVM) hosts, providing a distribution of customer resources into these "chunks".

FIG. 1C depicts another illustrative implementation across a variety of disparate-technology clusters or hosts, namely a VMware cluster/host 150, a KVM cluster/host 152 and a Power-VM cluster/host 154. Each of these clusters/hosts is then coupled via their respective connectivity component 156, 158, 160, to the processing component or components associated with customer resource management/delivery 162 (also referred to as "xStream"). The xStream processing component or components may correspond, in whole or in part, to elements 106 discussed elsewhere herein. The processing component or components 162 may also be coupled via various other resource management components 106g, 106h to storage 164 and network 166 facilities. Together, all of these elements may interact as a result of instructions associated with the overall resource management functionality 106 to achieve the innovations herein. Here, for example, the information from the hypervisors/blocks 156, 158, 160, storage 164 and networking 166 infrastructure may be aggregated into xStream 162 in order to determine the IUs available and/or the location(s) to place new workloads. Such implementations may also include a connection to a service management system which contains all of the associated service level limits, if not stored within xStream 162. However, it should be noted that the structure/relationships shown in FIG. 1C are but one illustrative implementation. The xStream 162 and/or processing components 106 herein may be connected, inter alia, to disparate hypervisors and/or have other arrangements, and it is noted that the innovations herein are not limited to any such single representation in the drawings.

Figure 2A:
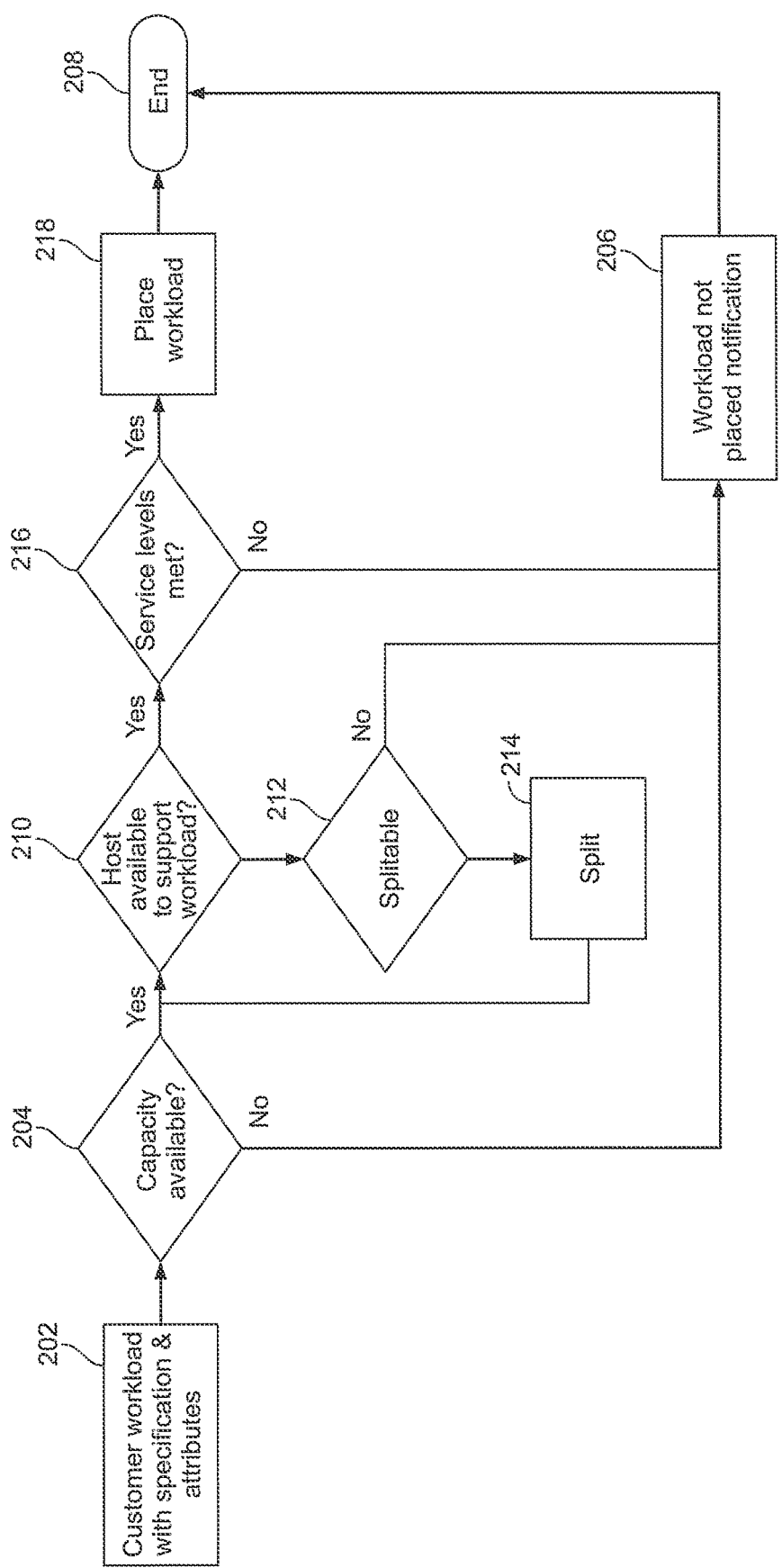
FIGS. 2A-2D are flow and block diagrams of illustrative processes and/or aspects of resource management according to disclosed implementations.
Figure 2B:
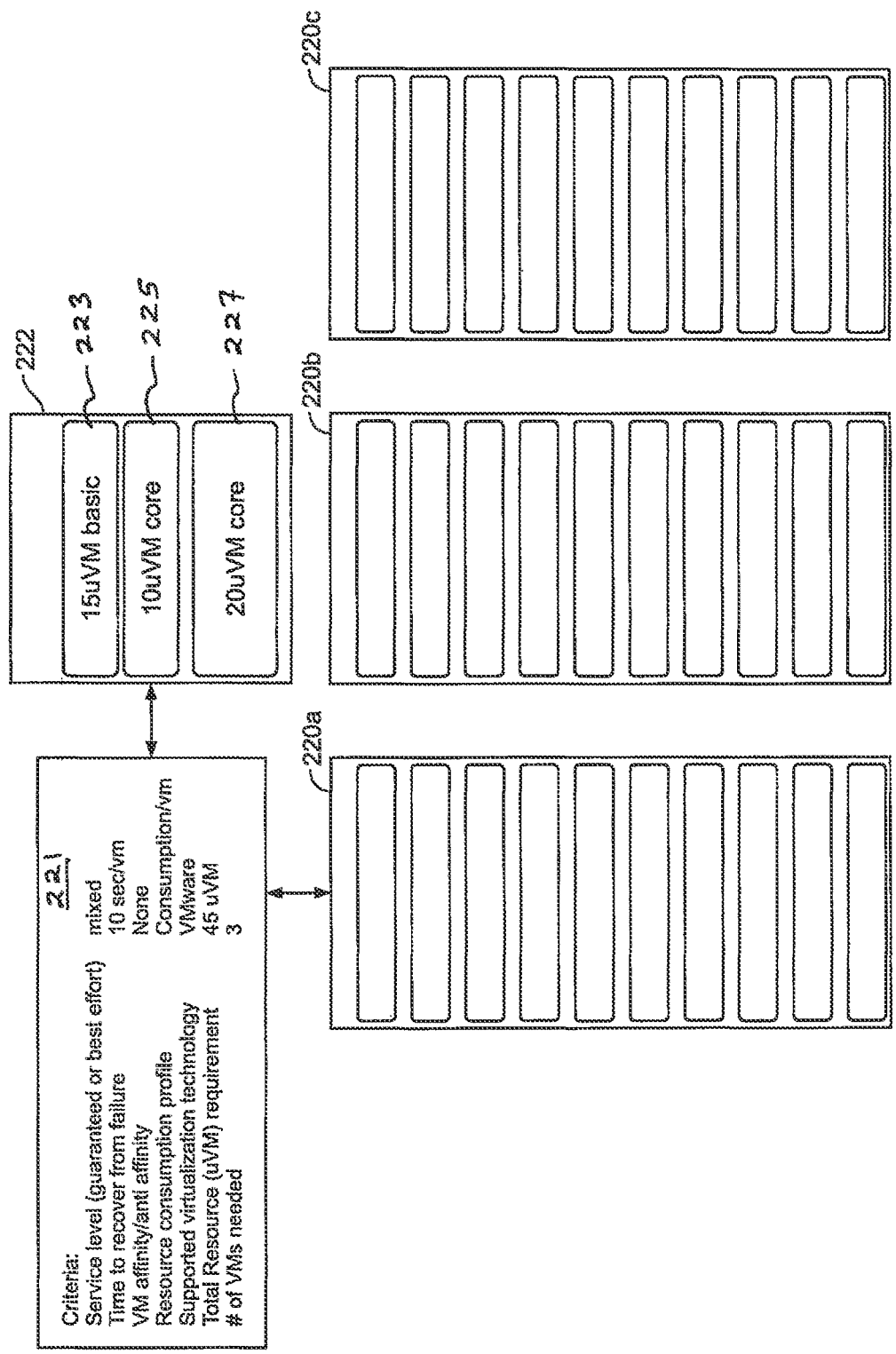
Figure 2C:
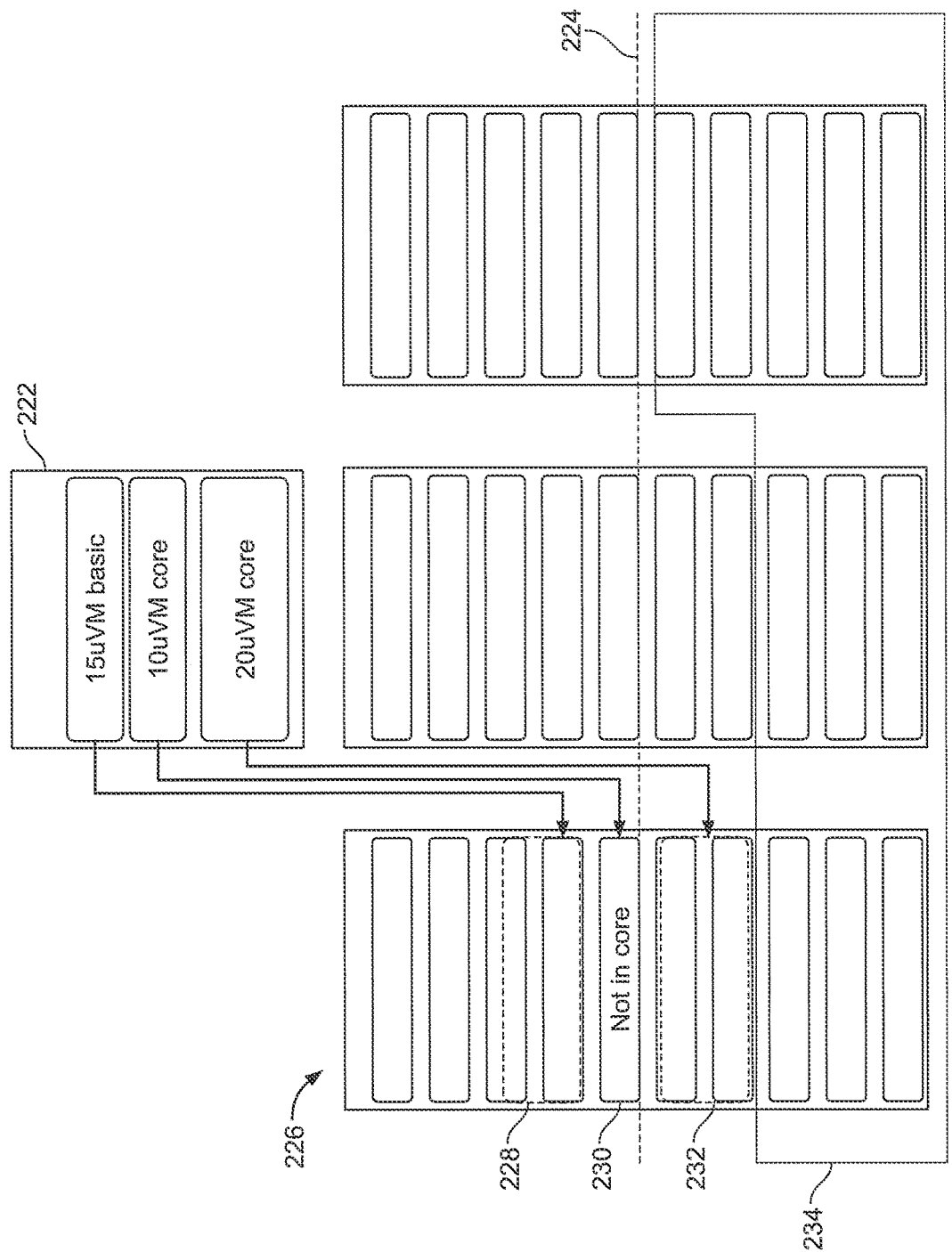

FIGS. 2A-2C are flow and block diagrams of illustrative processes, algorithms and/or aspects of resource management according to disclosed implementations. Here, for example, such methods or algorithms may define, based on set criteria, a best fit number of chunks for a customer's resource requirement or resource pool allocation. This set of criteria can include, for example, the number of resource units used as well as the number of virtual machines (VMs) that the customer has and the VM/unit ratio. Referring to the high-level algorithm of FIG. 2A, customer workload information is first generated or obtained, at 202, including specifications and attributes such as the VM and VM ratio information. Next, a determination is made if capacity is available across the cluster-based resources to handle the workload, at 204. If sufficient capacity does not exist, a notification is generated, at 206, indicating that the workload cannot be placed, and the algorithm ends 208. If, at 204, the capacity determination processes establishes that sufficient capacity to handle the workload exists, processing proceeds to a second determination step. Here, at 210, a determination is made as to whether a host is available to support the workload. If not, the algorithm then determines whether the workload is splitable, at 212. If the workload is not splitable, a notification is issued that the workload is not placed, at 206, and the algorithm ends 208. If the workload is determined to be splitable, the workload is then split, at 214, and the subdivided portions of the original workload are processed through the second determination step 210. If, at 210, the algorithm confirms that a host is available to support the workload, a verification process is then performed, at 216, to verify whether necessary service levels can be met via placement on the host. If the service levels cannot be met, a notification is issued that the workload is not placed, at 206, and the algorithm ends 208. If the service levels can be met, the workload is placed on the host(s), at 218, and the algorithm ends 208.

More detailed examples of such methods and algorithms are discussed below in connection with FIGS. 4A-4B, with these illustrations using a defined maximum number of virtual machines per resource chunk value of "10." Note that the term "resource chunk" is also referred to herein as "resource pool". This value of the maximum number of virtual machines per resource chunk reflects a quantity of virtual machines set to ensure an appropriate speed for high availability (HA) restart or maintenance migration. This value may be calculated, for example, after infrastructure speed testing and VM memory map sizing, and may be determined to fit the following calculation:

$$\text{Acceptable "outage" time (based on infrastructure guarantees)/migration or HA time per VM} \geq \text{VM per chunk}$$

Here, for example, given an acceptable outage window of 60 seconds and a high availability (HA) time per VM of 10 seconds, then implementations herein may proceed with the value of 6 (60/10) or fewer VMs per chunk.

FIG. 2B is a block diagram illustrating various hosts 220a, 220b, 220c, a set of basic resource information for a customer 222 as well as a listing of more detailed resource environment/criteria 221 associated with the customer. In the example of FIG. 2B, the basic customer resource information 222 includes a customer virtual machine (VM) 227 value of 20 uVMs (or IUs), a customer workload 225 value of 10 uVMs, and a basic (non core) set of VMs or IUs 223 having a value of 15 uVMs. Turning to the general environment and requirements 221, including associated customer criteria, e.g., before a placement decision is made, we see that the total customer resource requirement is the sum of these 3 values, or 45 uVMs. With regard to additional criteria for this customer as shown in FIG. 2B, a mixed service level (both guaranteed and best effort) is required, time to recovery from failure is 10 sec/VM, there is no VM affinity or anti affinity, the resource consumption profile is consumption/VM, supported virtualization technology is VMware, and the quantity of VMs needed is three. Though not shown in FIG. 2B, "VM affinity" requirements may include such features as the need to run certain VMs in the same host to reduce network utilization/traffic/latency between the VMs. The resource consumption profile may be a model that defines the past resource consumption and expected resource consumption. In general, customer workload is defined with certain attributes that will be used for placement. As illustrated in connection with FIGS. 2C-2D, a goal of implementations herein is to determine the placement of the workload within the cluster based on the defined criteria (constraints).

Figure 2D:
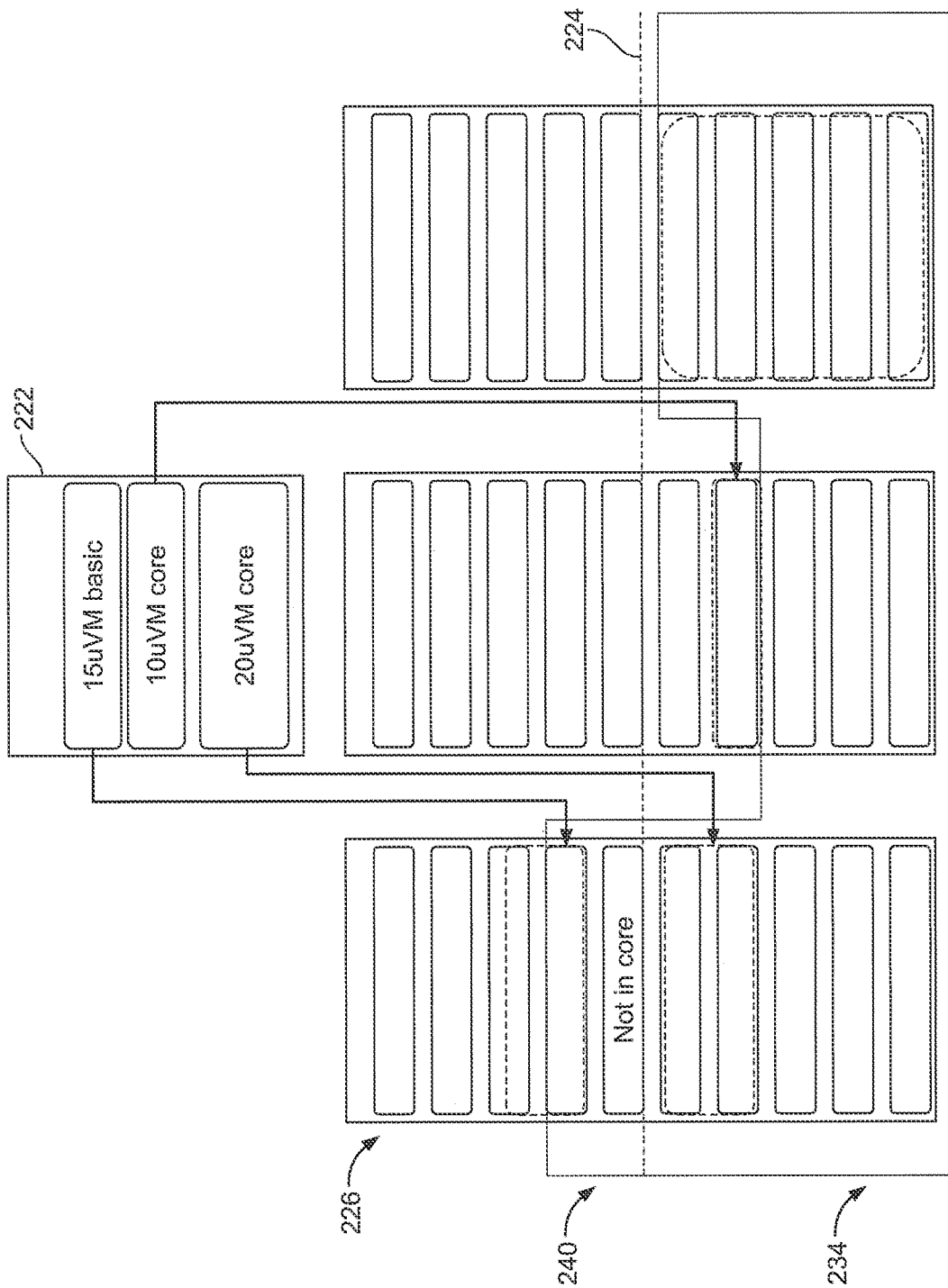

Turning to FIG. 2C, the same exemplary customer resource components are shown above, at 222, as well as 3 hosts down below with a line 224 delineating the core (guaranteed) threshold level for the cluster, with guaranteed resources placed below the threshold line 224. Here, there is insufficient room for both the 10 uVM and 20 uVM portions in the first host 226 since these are both designated as requiring placement in the core (guaranteed) service region. Accordingly, placement does not occur, as migration to the first host would exceed host level for guaranteed resources. Additionally, recovery time limits must be supported for the customer's workload as well as the workload for other customers running on the host. In this case, the 10 uVM workload would not meet service level requirement and thus needs to be placed on a different cluster. FIG. 2D illustrates how such a VM portion may be moved to a second host within a cluster, e.g., in order to satisfy resource guarantees. Additionally, a new resource pool 240 encompassing both hosts may be established for such incoming customer. Here, the constructed pool may be used to enforce quotas for resource consumption and policy.

Figure 3:
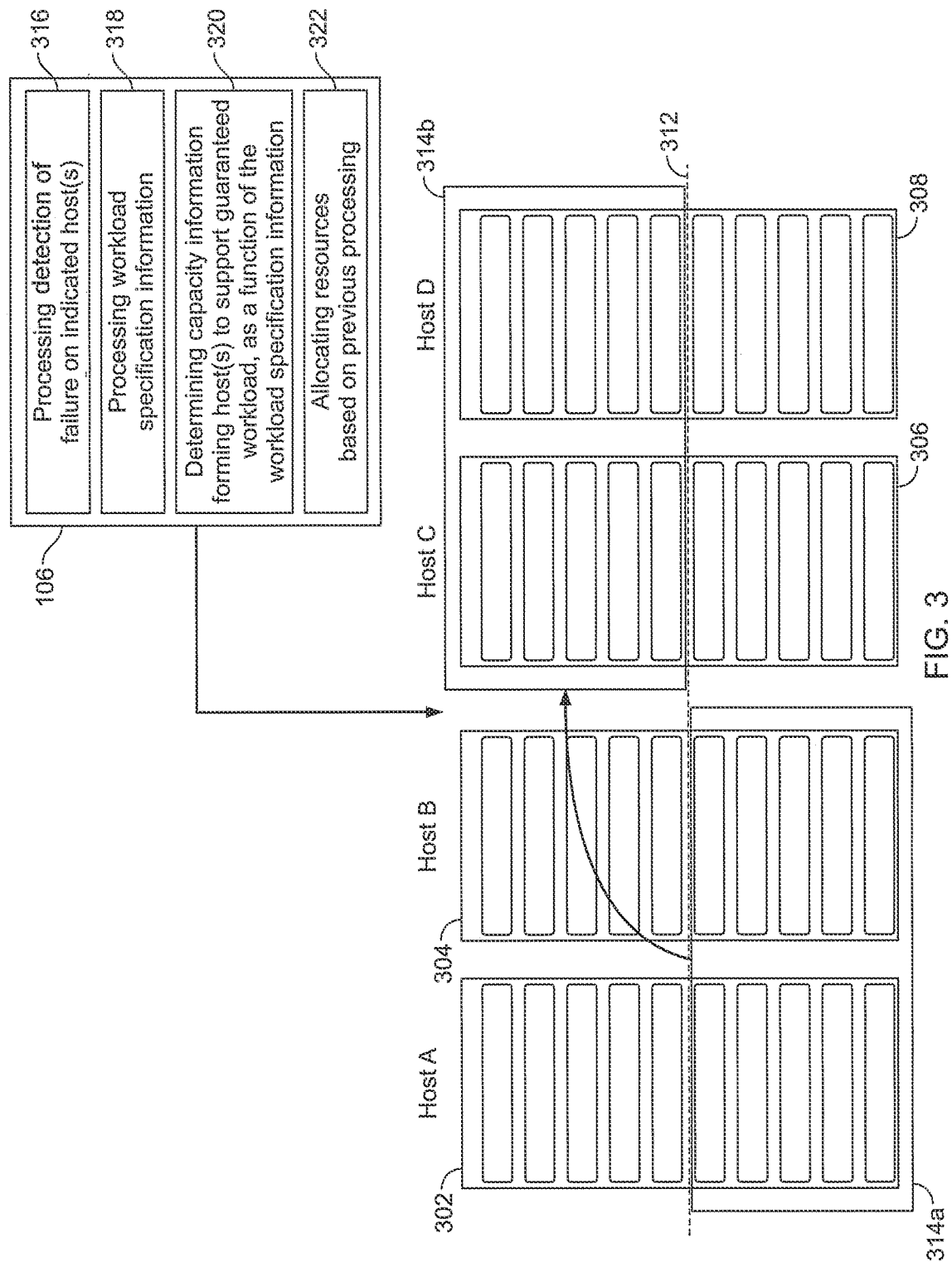
FIG. 3 is a diagram illustrating exemplary aspects of resource management service provision according to a disclosed implementation.

FIG. 3 is a diagram illustrating exemplary aspects of resource management service provision according to a disclosed implementation. Here, for example, resources in the data center may be managed so that VMs/workloads running on hosts with a guaranteed service level can be supported on other hosts in the event of a failure. Referring to FIG. 3, in the event of a failure on hosts A and B, a guaranteed workload 314a can be supported via migration to resource location(s) 314b on the remaining hosts C and D. Note that the term "resource units" is also referred to herein as "infrastructure units" (IU) or data center units. In some embodiments, the hardware resources (and accompanying software) of a data center (or a pool of servers, or a pool of VM hosts) can be partitioned so that the hardware (and/or software) resources of the data center units are guaranteed to perform at predefined resource limit values. In other words, the resources of the data center units can be managed, e.g. via one or more resource management components 106, so that they provide guaranteed levels of service that correspond with each (or every) predefined resource limit value from a set of predefined resource limit values.

Here, for example, an illustrative resource management component 106 process may include processing detection of a failure on indicated host(s) 316, processing the workload specification information for the workload(s) to be migrated off of the failed host(s) 318, as a function of the workload specification information, determining capacity information of remaining hosts to support guaranteed workload 320, and migrating resources from the failed host(s) as a function of this determination process 322. Here, for example, the host capacity to support the guarantees may be statistically determined based on the workload specification for quantity of VMs, VMs per host, service level, VM affinity, and/or supported virtualization level(s), as also described elsewhere herein.

Figure 4A:
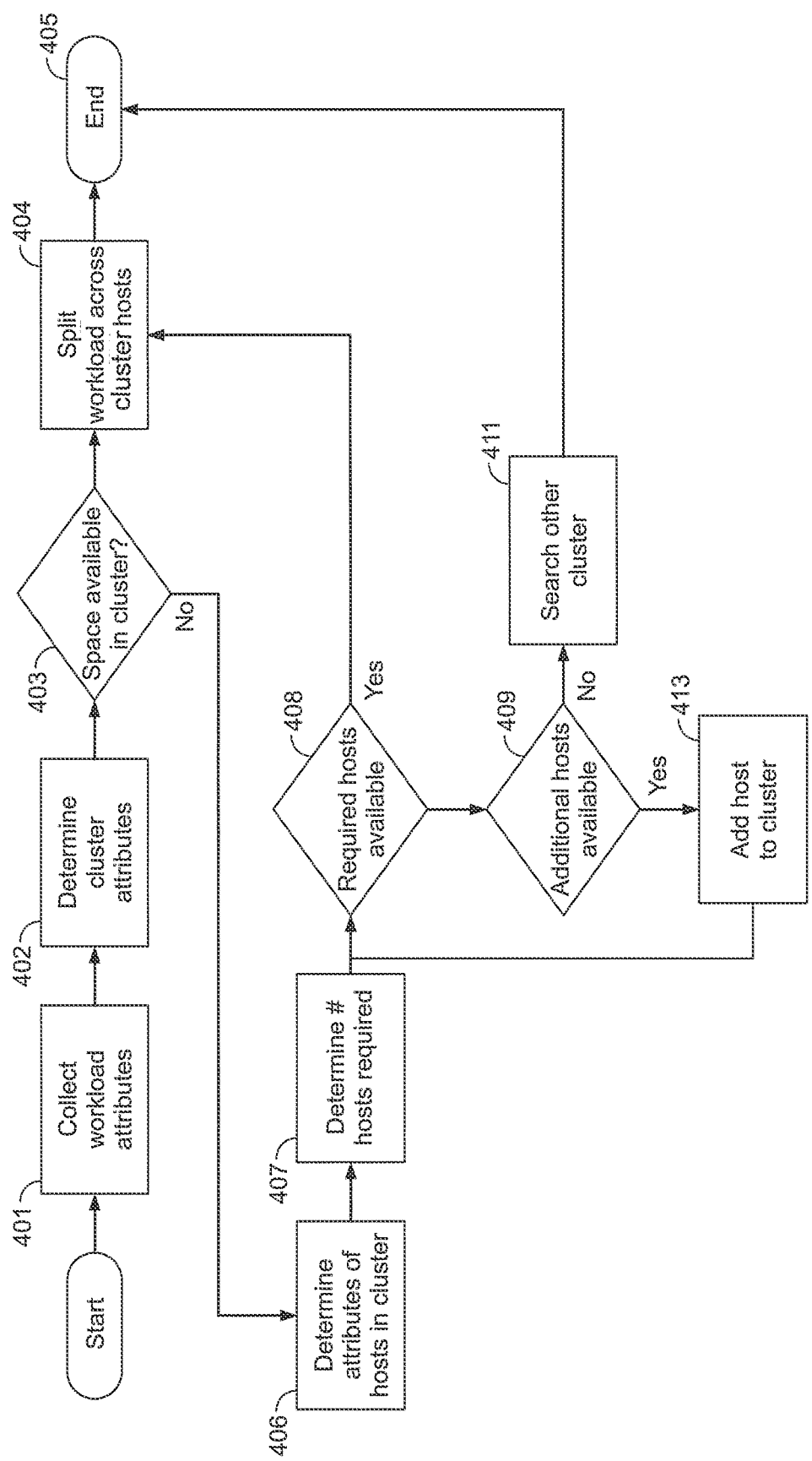
FIGS. 4A-4B are flow diagrams showing illustrative processes and/or aspects of best fit resource management processing according to disclosed implementations.
Figure 4B:
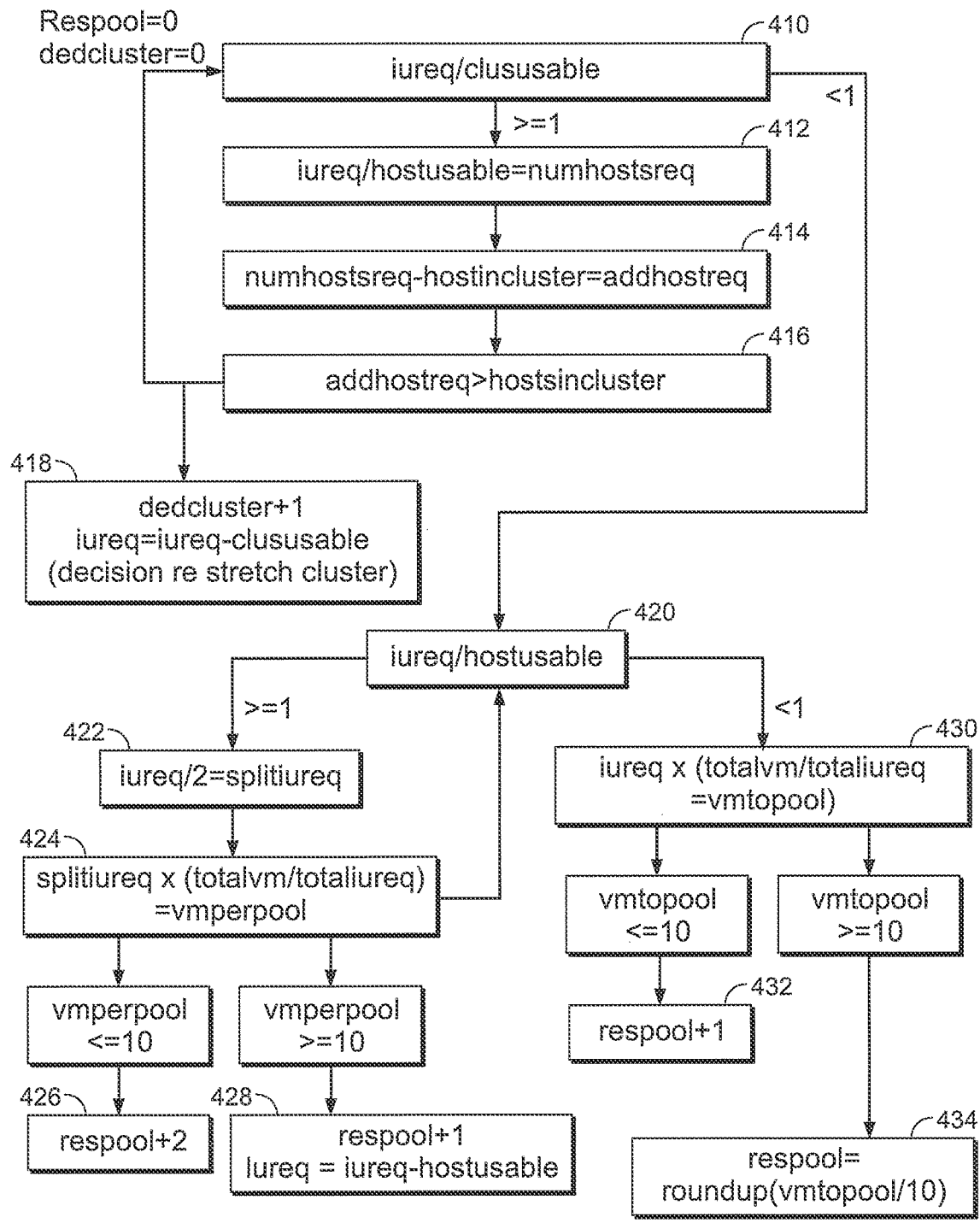

FIGS. 4A-4B are flow diagrams showing illustrative processes and/or aspects of best fit resource management processing according to disclosed implementations. In a first implementation shown in FIG. 4A, an illustrative process may begin by collecting or obtaining workload attributes 401 as well as determining or processing cluster attributes 402. Next, at 403, a determination may be made as to whether space in the cluster is available for the workload. If space is available, the workload is split, at 404, across hosts in the cluster, and the algorithm ends 405. If however, at 403, space is not available in the cluster, the algorithm proceeds to a step of determining attributes of hosts in the cluster, at 406. In conjunction, the algorithm next determines the quantity of hosts required, at 407, and then determines if this quantity of hosts are available on the present cluster, at 408. If such quantity of hosts is available, the algorithm proceeds to split the workload across the cluster hosts, at 404, and ends 405. If however, at 408, a determination is made that the hosts required are not available, a search for additional hosts is performed, at 409. Here, if additional hosts are located, such hosts are added to the cluster, at 413, and the algorithm proceeds back to step 408. However, at 409, if no additional hosts are available, the algorithm proceeds to search for available space on other clusters, at 411, and ends 405.

Referring to the implementation of FIG. 4B, the illustrative algorithm may begin with a respool (resource pool) value of 0 and a decluster (dedicated cluster) value of 0. This example of the method or algorithm above assumes a maximum of 10 VMs may be employed in a resource pool or chunk. The algorithm may begin with a first processing phase, at 410, wherein if IUreq (number of IU required) divided by clususable (number of cluster usable IU) is greater than or equal to 1, then a sufficient requirement exists to dedicate at least one cluster of resources to a customer and the method proceeds to 412. At 412, IUreq divided by hostusable (number of host usable IU) is calculated to produce numhostsreq (number of hosts required). Then, at 414, numhostreq minus hostincluster (number of hosts in cluster) is calculated to produce addhostreq (additional hosts required). Next, at 416, if addhostreq>hostincluster, a decision is made regarding whether to continue to iterate through additional clusters or whether to define a bespoke "stretched" cluster. If the decision is to define a bespoke "stretched" cluster, then at 418 dedcluster is incremented by 1 and the value of iureq is reduced by clususable; and the value of iureq is now tested again through another iteration starting back at 410.

If, at 410, IUreq divided by clususable is less than 1, then the customer's requirement will fit inside a single cluster and the method proceeds to a second processing phase, beginning at 420. Here, at 420, if IUreq divided by hostusable is greater than or equal to 1, then a sufficient requirement exists to place the requirement across more than one host and the method proceeds to 422. At 422, IUreq is divided by 2 to produce splitIUreq (split IU requirement). The algorithm then proceeds to 424, where splitIUreq is multiplied by totalvm (total number of VMs) divided by totalIUreq (total IU requirement) to produce vmperpool (a number of VMs per pool). If vmperpool is less than or equal to the defined chunk value (10 VMs in this example), then the algorithm proceeds to 426, where respool is incremented by 2 (split-IUreq) and the algorithm ends. If, at 424, vmperpool is determined to be greater than the defined chunk value (i.e., 10 VMs), then the algorithm proceeds to 428, where the VM's respool is incremented by 1 and IUreq is recalculated to be IUreq minus hostusable; this value of IUreq is then sent back to the first step of the second processing phase for reevaluation at 420.

If, at 420, IUreq divided by hostusable is less than 1, then the required resource will fit inside a single host and the method proceeds to a third processing phase, at 430. There, at 430, IUreq is multiplied by totalvm/totalIUreq to produce a vmtopool (VM to resource pool) value. If a determination is made at 430 that vmtopool is less than or equal to the chunk value (i.e., 10 VMs), then the algorithm proceeds to 432, where the value of resource pool (i.e., the VM's respool) is incremented by 1 and the method ends (i.e., the algorithm exits). If vmtopool is greater than the chunk value (i.e., 10 VMs), then at 434 respool is calculated by rounding up the results of dividing the number of VMs by the defined chunk value (i.e., 10 VMs limit) and the method ends (i.e., the algorithm exits).

After the method has been performed, a number of appropriate resource pools for the customer is identified. The sizes of these resource pools should be equal to any relevant "Ghost" pool for a customer, as explained below, and should be the size of the largest individual pool. In some implementations, the size of the largest individual pool may be calculated based on:

$$\text{Totaliureq/respool} = \text{respool size}$$

If a scenario exists where one or more virtual machines would not be able to fit inside a single resource pool, then additional calculation may be performed. Such calculation (s) and decision processing may also be included within the method or algorithm. Moreover, once defined, the resource pools can then be distributed throughout the cluster usable space, with unused (except in node tolerance events) tolerance ghost pools or "ghosts" defined on any host not containing a live pool. In the event that a customer has resource pools on all hosts in a cluster, then ghost pools may be defined on multiple hosts.

FIG. 5 is a diagram illustrating exemplary aspects of resource management spacing and ghost features according to a disclosed implementation. Referring to the illustrative implementation of FIG. 5, the resource clusters and hosts 502, 504, 506, 508 are configured with highwater marks to accomplish site and cluster tolerance innovations. These highwater marks are represented by the first line 513 between the "Usable" space and the "Tolerance" space, and the second line 515 between the "Tolerance" space and the "Host" space. Customer A 510 ("CustA") exists on hosts 1-3 so the "Ghost" for Customer A 520 is defined on host 4. Customer B 512 ("CustB") exists on hosts 2-4, and hence has its ghost 522 defined on host 1. Customer C 514 ("CustC") exists on only host 4. As such, the "Ghost" for Customer C 524 may be defined on any of hosts 1-3. By defining ghost pools or ghost chunks in this manner, implementations herein may achieve further resilience within the cluster, such as n+1 resilience, via provision of the customer resources on an additional host from which access, migration or recovery may occur.

In further implementations of the systems and methods herein, ghost pools may be used during maintenance windows or node tolerance events. Upon resumption of normal service, VMs may be migrated back to originating pools. Allocating pools and failover in this fashion has a number of benefits:

VMs are placed together, thereby leveraging faster communication, and resulting in a more expected set of communication paths (e.g., firewalls can be defined on a few hosts rather than all)

maintenance windows only need to account for affected location hosts rather than the entire cluster. In FIG. 5, for example, CustA has a maintenance window that is affected by maintenance to Hosts 1-3, but not Host 4; CustB has a maintenance window that is affected by maintenance to Hosts 2-4, but not Host 1; and CustC has a maintenance window that is affected by maintenance of Host 4, but not Hosts 1-3 constraints remain in place even with loss of management service

While some of the above disclosure relates, at least in part, to the initial placement of customer resources, implementations described herein also provide the ability to dynamically shift workloads and appropriate additional resource. A management service (or process or application), such as 114 in FIG. 1A, may be provided for monitoring and management of the workloads within the cluster. This management service may be configured in a number of ways. For example, such management service can be configured to respond to highwatermark "alerts" from the Cgroups (control groups) and/or process migration instructions related thereto. Migration to a Cgroup may be based on the historical and expected usage profile. Further, as set forth elsewhere herein, in cases where the workload is assessed to remain where it is, the current Cgroup may be expanded to provide more resources.

The management service may also be configured to query the Cgroups for performance information relating to the group and the VMs running within it. Further, it may be configured to initiate a migration of a VM based on its workload to an alternative Cgroup. This may be done to provide room for a "busy" service within its originating Cgroup. For example, if the quantity of pools at high water mark is less than the total quantity of pools, then functions such as defining free space in lower watermark pools, defining "best fit VMs" and vMotion may be performed. Here, vMotion may be the migration of a VM from one host to another while the machine continues to run and accept new requests. For example, the VMs may be migrated from one pool on one host to another. Overall, the management service may also perform migration to a Cgroup with sufficient "free" space to run its task.

Further, the management service may be configured to dynamically alter Cgroup limits to provide "burst" features, such as expanding the Cgroup limit over a particular timeframe or in other limited circumstances such as with regard to temporal requirement or conditions. Here, for example, if the quantity of pools at high watermark equals the total quantity of pools then the management service may be configured to dynamically increase cgroups size across the board and/or burst into ghost via vMotion. Additionally, the management service may also be configured to define and destroy a Cgroup to provide "timed access" to a system (e.g., end of month payroll, etc). Here, for example, the service may schedule a resource allocation to a zeroed Cgroup then re-zero at end of its allocated time. Such processing may be performed provided the cluster has unallocated resources pools available (e.g., state is n>n−1) and no site tolerance issues are present, then it would be acceptable to use unallocated resource pools for these tasks.

Figure 6:
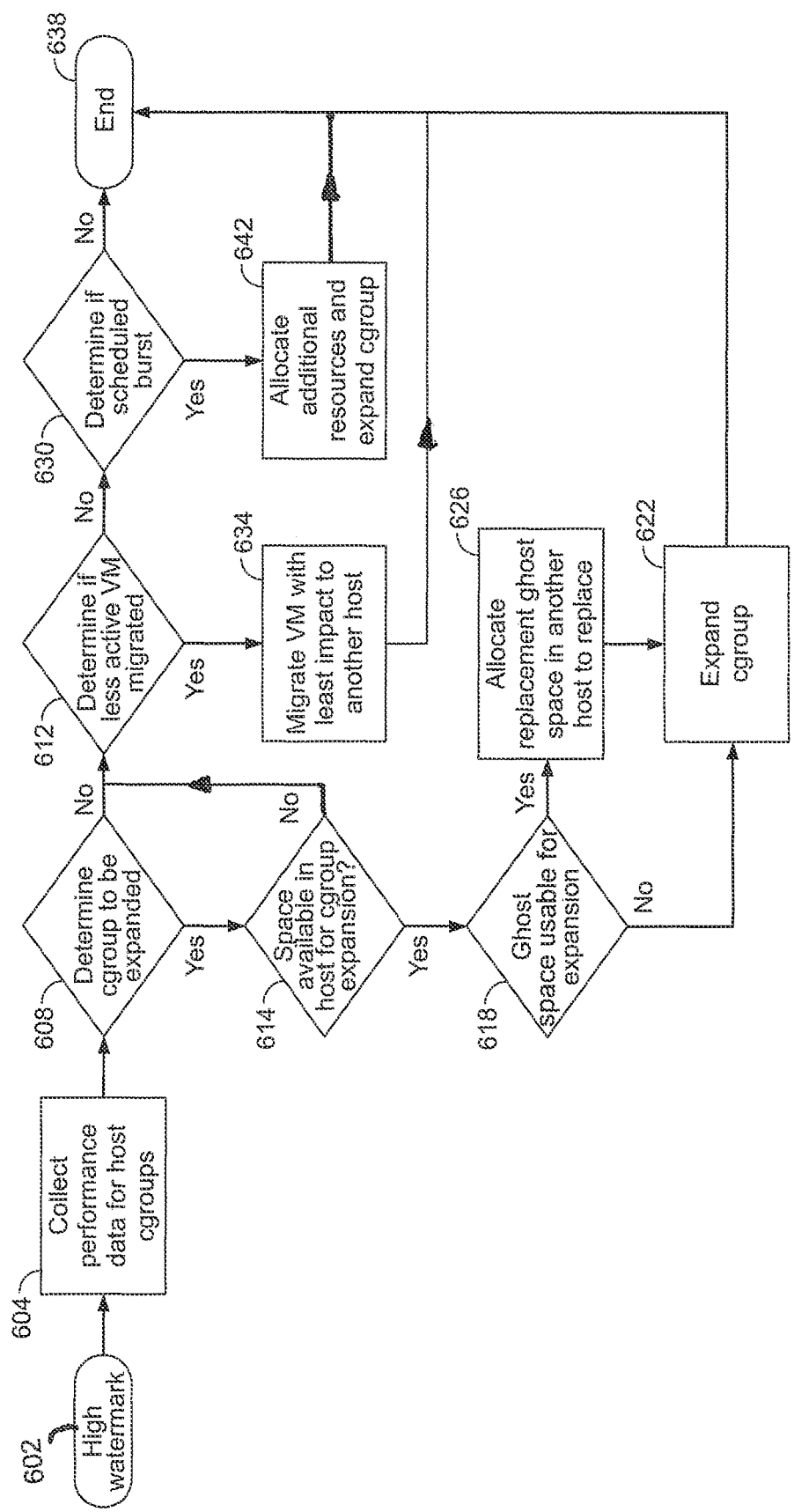
FIG. 6 is a flow diagram showing an illustrative process of resource management service provision according to a disclosed implementation.

FIG. 6 is a flow diagram showing an illustrative process of resource management service provisioning according to various implementations herein. Referring to FIG. 6, implementations relating to allocating and/or expanding cluster groups are disclosed. Upon receipt of a high watermark 602, for example, systems and methods herein may initially collect performance information for host cluster groups, at 604. Then, a determination may be made, at 608, as to whether a cluster group may be expanded to address the high watermark. If a cluster group suitable for expansion is identified, processing is performed, at 614, related to verifying whether space is available in the relevant host(s) for the cluster group expansion. In instances where no such host space is available, processing proceeds to 612, as explained below. If host space is available, then a determination may be made, at 618, as to whether existing ghost space can be used for the expansion. If such ghost space is unavailable, processing related to expanding the cluster group without ghost space manipulation is performed, at 622, and the method ends 638. If, at 618, a determination is made that ghost space is available on the relevant host(s) for expansion, a step of allocating replacement ghost space may be performed, at 626. Here, for example, replacement ghost space may be created in another host such that the ghost space on the subject host may be reallocated to the other host. Once the ghost space has been reallocated, processing may proceed to a step of expanding the cluster group into the replaced ghost space on the present cluster, at 622, and the method ends 638.

If the algorithm concludes, in steps 608 or 614, that no space is available for cluster group expansion, processing may proceed to determining if any less active virtual machines (VMs) may be migrated, at 612. If less active VMs are not available for migration, a determination may be made, at 630, as to whether a scheduled burst may be implemented to expand the cluster group. If such burst processing is not available for expansion, the method ends at 638. When such burst processing is available to expand the cluster group, processing proceeds to step 642, where additional burst resources are allocated and the cluster group is expanded, and thereafter the method ends 638. If, at 612, a determination is made that less active VMs suitable for migration to resolve the issue exist, instructions to migrate such VMs with least impact to another host may be processed, at 634. With the allocation issue resolved via migration of less active VMs, the method may end 638.

Turning back to some more general aspects, the management service that provides the functionality herein may be entirely or substantially stateless in that the cluster groups themselves provide the information relating to their own performance and to the performance of the virtual machines within them. To this end, various implementations of the management service can have various options such as (1) being configured to run outside the cluster, or (2) being configured to run inside of the cluster and be managed as a cluster resource. The benefits of option 1 are that such configuration(s) maintain a traditional management model. A single virtual machine, however, is then responsible for the maintenance of the entire cluster, and some form of management clustering may be included to promote continued operation of the single virtual machine.

The benefits to option 2 are that the cluster technology is already in place and the clusters may become largely self sustaining. At any one time, however, one of the hosts would have the additional overhead of monitoring the cluster. In some implementations of a management service using option 2 and based on a distributed model, one server may be configured to monitor a customer's Cgroup alerts. Here, for example, upon receiving a Cgroup alert or responding to a timed event, the cluster can instruct a peer to carry out the maintenance of the task, which would offset the overhead of the procedure. Given that the resources of each customer is on a defined set of servers, this maintenance task could be allocated to the affected server(s). This can consequently generate an expected overhead and reduce management impact on other customers within the cluster. In other words, if the management service is run by a single management node (server), then any migration or resource re-allocation may generate an overhead on that server, and that server is a resource used by all other customers. If the management service or process is configured to execute on a specified host, then only customers on that host will share any processing overhead, and one of those customers will be the customer causing that overhead. In this regard, the management service may be implemented, at least in part, as a monitoring service/process (or application) and the monitoring service/process can be maintained solely as a monitoring process. In the event of a trigger event occurring, then the management service/process can spawn a customer-specific migration decision event or process on the host generating the trigger, and then the management service/process can return to its monitoring state. The customer-specific migration decision process can then proceed to evaluate the requirements and define a best fit resolution and enact that plan. Once customer-specific migration decision process is complete, the customer-specific migration decision process can expire. If any balance issue exists after the customer-specific migration decision process has performed its functions, the monitoring service/process can generate new customer-specific migration decision process(es) as appropriate; this should result in a per-customer iterative balance.

Figure 7:
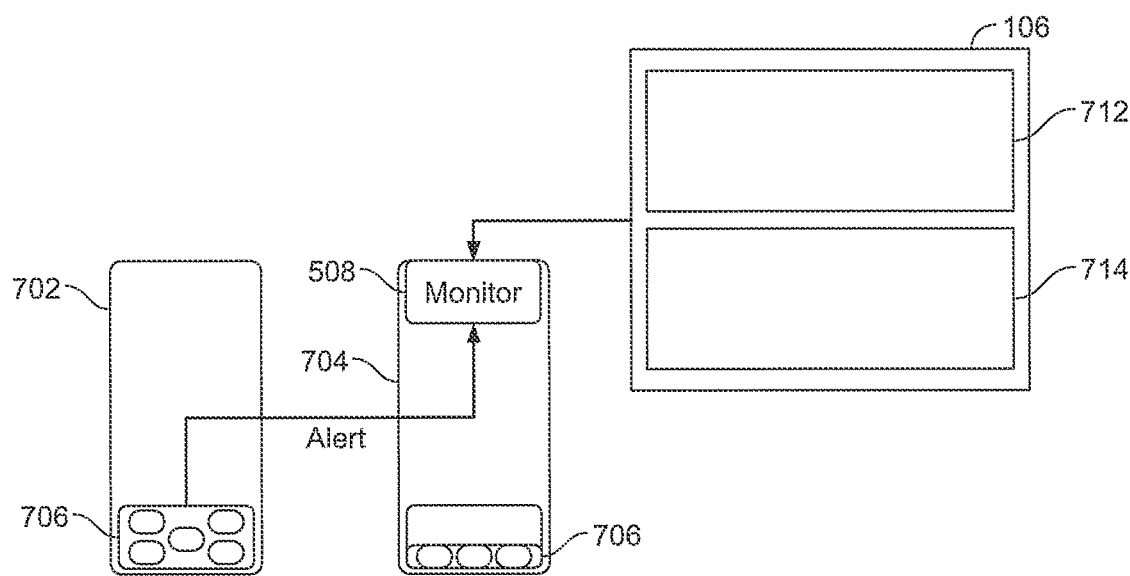
FIGS. 7-10 are diagrams illustrating exemplary aspects of resource management allocation features according to disclosed implementations.
Figure 8:
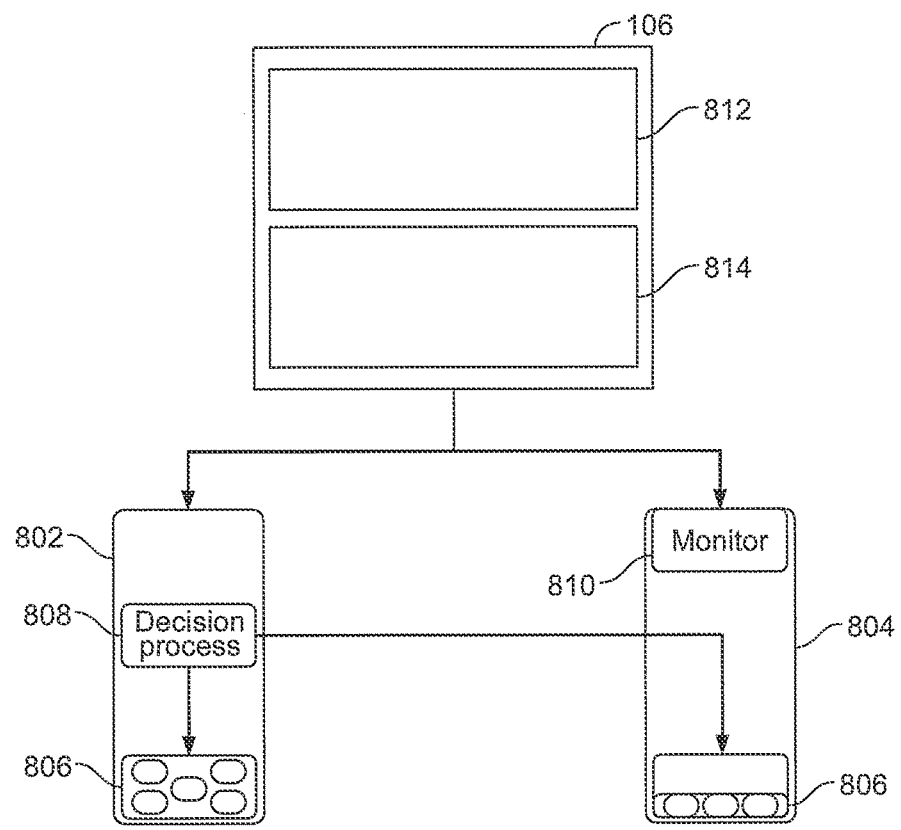
Figure 9:
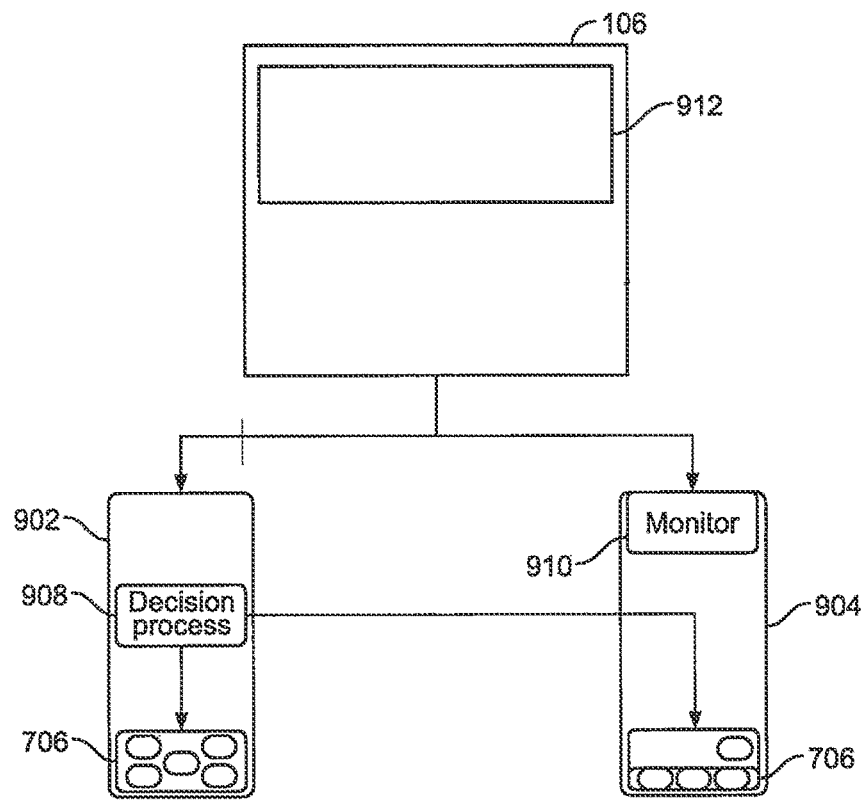
Figure 10:
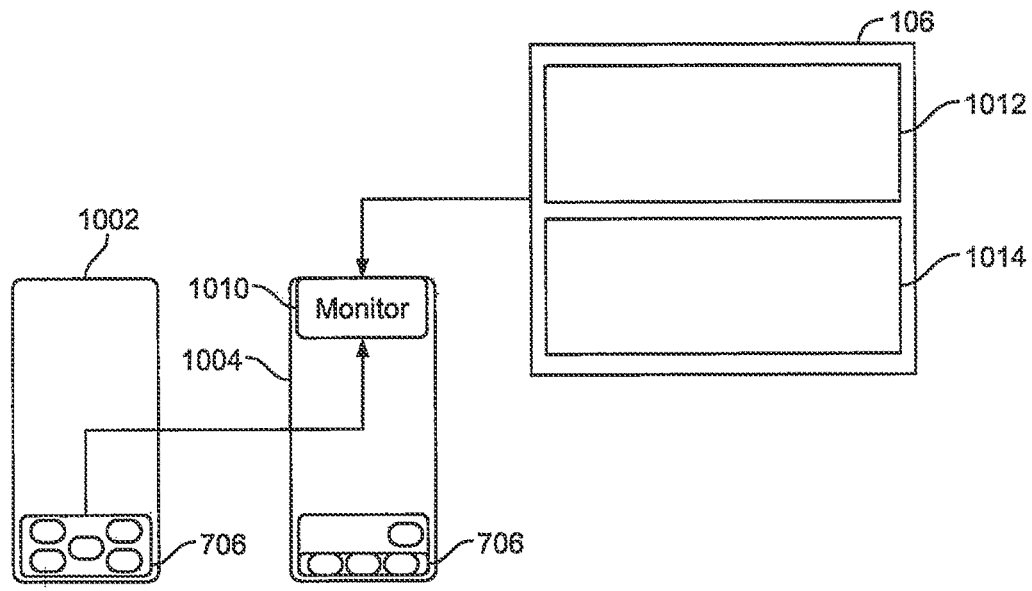

FIGS. 7-10 are diagrams illustrating exemplary aspects of resource management allocation features according to disclosed implementations. Referring to FIG. 7, a monitoring service/process 508 may be configured to run 712 on a host 704, where another host 702 generates 714 a high watermark alert. Then, as shown in FIG. 8, the monitoring service/process 508 generates or spawns 812 a customer-specific migration decision process 808 on the affected host 802. This customer-specific migration decision process 808 may query the alternate pools and may make a "best fit" decision 814 on VM placement, etc. Next, as shown in FIG. 9, the customer-specific migration decision process 908 may generate a "Balance" migration 912 of a VM to an alternate Cgroup. Finally, as shown in FIG. 10, the balancing process is completed and the customer-specific migration decision process lapses.

It should be noted that the VM Cgroup allocation features herein may be implemented as an extension to the VM XML configuration file, and this may also extend into the open virtualization format (OVF) files, etc.

Figure 11:
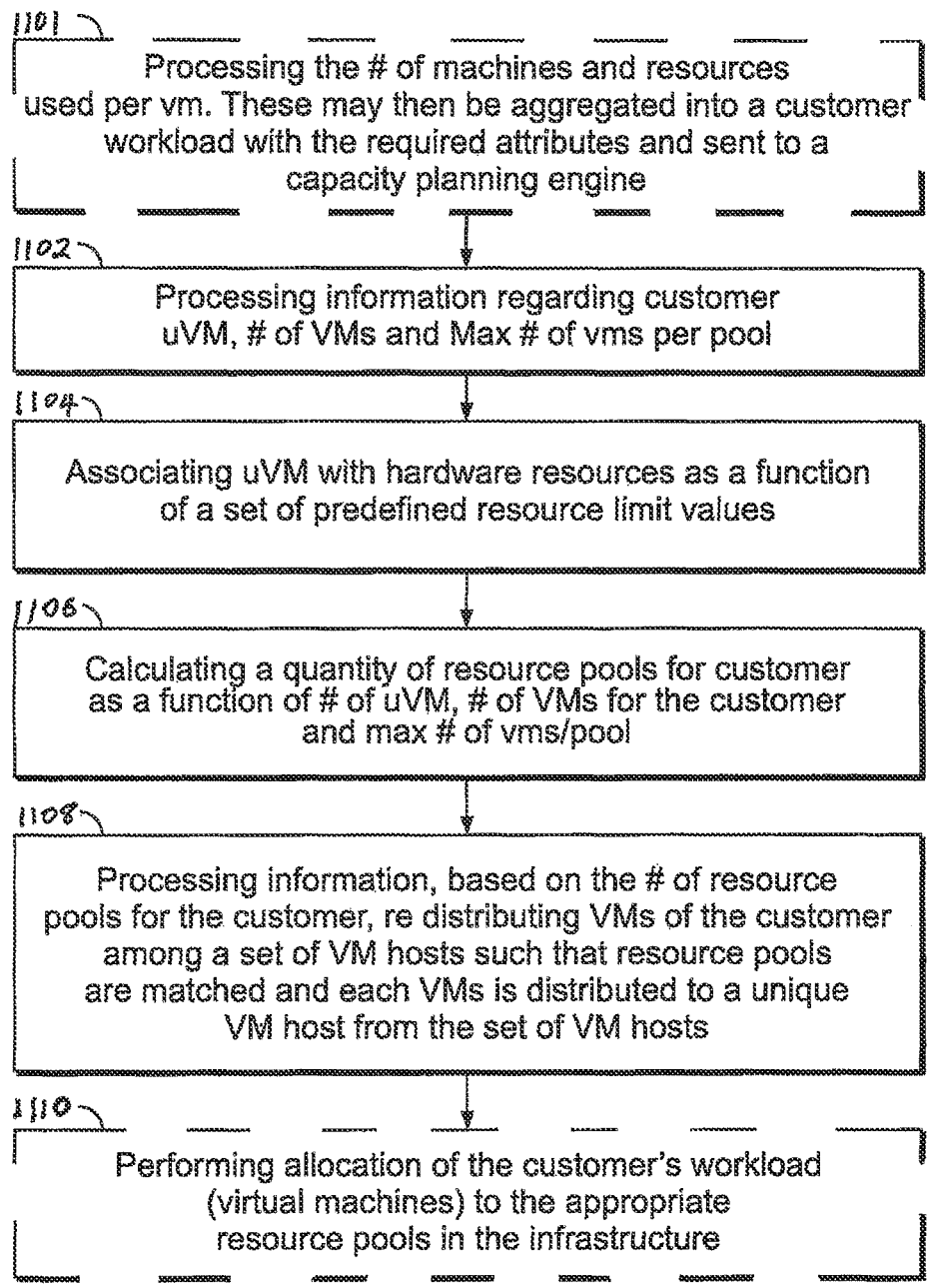
FIG. 11 is a flow diagram showing illustrative methods of resource management processing according to disclosed implementations.

FIG. 11 is a flow diagram showing illustrative methods of resource management processing according to disclosed implementations. Referring to the core steps of the implementation of FIG. 11, an illustrative method may include receiving or processing information regarding an indication of a number of infrastructure units for a customer, an indication of a number of virtual machines (VMs) for the customer, and/or an indication of a maximum number of VMs per resource pool 1102. Further, the method may include associating IUs for the customer with hardware resources managed as a function of a set of predefined resource limit values 1104. The method may also include calculating a number of resource pools for the customer based on the number of infrastructure units for the customer, the number of VMs for the customer, and/or the maximum number of VMs per resource pool 1106. Finally, the method may also include processing information (such as preparing, handling or sending a signal) based on the number of resource pools for the customer to cause VMs of the customer to be distributed among a set of VM hosts 1108, such that each resource pool for the customer is associated with VMs of the customer and is distributed to a unique VM host from the set of VM hosts.

FIG. 11 also illustrates several steps on the front and back of the method discussed above, namely steps 1101 and 1110. Referring to these optional features, another illustrative method may also include an initial step of processing the number of machines and resources used per virtual machine (VM) 1101. Here, for example, such determined information may then be aggregated into a customer workload with the required workload and sent to a capacity planning engine. The method may then proceed to the core steps of processing information regarding a number of infrastructure units (IUs) for a customer, an indication of a number of virtual machines (VMs) for the customer, and/or an indication of a maximum number of VMs per resource pool 1102; associating each infrastructure unit from the infrastructure units for the customer with hardware resources managed based on a set of predefined resource limit values 1104; calculating a number of resource pools for the customer based on the number of infrastructure units (IUs) for the customer, the number of VMs for the customer, and/or the maximum number of VMs per resource pool 1106; and processing information, based on the number of resource pools for the customer, regarding distribution of VMs of the customer among a set of VM hosts such that each resource pool for the customer is associated with VMs of the customer and is distributed to a unique VM host from the set of VM hosts 1108. Finally, such method may also include a step of performing allocation of the customer's workload (VMs) to the appropriate resource pools in the infrastructure 1110.

In general, the innovations herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on one or more servers, such servers may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where elements are connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Furthermore, aspects may be embodied in microprocessors having software-based circuit emulation, discrete logic (sequential and combinatorial), custom devices, fuzzy (neural) logic, quantum devices, and hybrids of any of the above device types.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A method for processing information related to management of a cluster based pool of resources comprising a plurality of clusters wherein each cluster comprises one or more hosts executing one or more virtual machines, the method comprising:
   establishing a resource requirement for a customer as a quantity of universal infrastructure units, wherein a universal infrastructure unit is defined as a function of processing speed and virtual machine memory size;
   associating highwater marks with each of the plurality of clusters, the highwater marks reflecting divisions between usable space and tolerance space, and between the tolerance space and host space reserved to ensure host activity;
   allocating resource pools for the customer to the plurality of clusters, wherein allocating the resource pools for the customer comprises allocating one or more live resource pools in the usable space of the plurality of clusters and allocating one or more ghost resource pools in unused tolerance space of the plurality of clusters, wherein the one or more ghost resource pools are either allocated to one or more hosts of at least a given one of the plurality of clusters not having any of the one or more live resource pools allocated thereto or, when the one or more live resource pools are allocated on all hosts in the given cluster, on multiple hosts within the given cluster;
   migrating, during at least one of one or more maintenance windows and one or more node tolerance events, one or more virtual machines executing one or more workloads of the customer from at least one of the one or more live resource pools to at least one of the one or more ghost resource pools; and
   migrating, upon resumption of normal service following said at least one of the one or more maintenance windows and the one or more node tolerance events, the one or more virtual machines executing the one or more workloads of the customer from said at least one of the one or more ghost resource pools to said at least one of the one or more live resource pools;
   wherein allocating the resource pools comprises, responsive to determining that a number of hosts in at least a threshold number of the plurality of clusters is insufficient to meet the quantity of universal infrastructure units established as the resource requirement for the customer, defining a stretched cluster combining at least two of the plurality of clusters and allocating the resource pools to the stretched cluster.

2. The method of claim 1 further comprising:
   analyzing the plurality of clusters by performing at least one of speed testing and virtual machine memory map sizing of the one or more hosts in each of the plurality of clusters.

3. The method of claim 1 wherein, as a function of the allocation of the resource pools and associated failover processing, the one or more virtual machines executing the one or more workloads of the customer are placed together in a limited subset of the one or more hosts in each of the plurality of clusters, to provide faster communication of information and an established set of communication paths.

4. The method of claim 3 wherein, as a function of the allocation of the resource pools and associated failover processing, at least one of the plurality of clusters is configured such that the one or more maintenance windows need only to account for a subset of the one or more hosts executing on said at least one of the plurality of clusters associated with affected locations, rather than entirety of said at least one of the plurality of clusters.

5. The method of claim 1 wherein, in connection with the allocation of the resource pools and associated failover processing, constraints are configured to remain in place even with loss of one or more management services of the plurality of clusters.

6. The method of claim 1 wherein establishing the resource requirement of the customer comprises:
processing information regarding the quantity of universal infrastructure units for the customer, an indication of a number of virtual machines for the customer, and an indication of a maximum number of virtual machines per cluster, the maximum number of virtual machines per cluster being determined via calculation of a maximum number of virtual machines that achieve a guaranteed level of service corresponding to one or more predefined hardware resource limits.

7. The method of claim 6 wherein the one or more predefined hardware resource limits comprise a predefined outage time, wherein the guaranteed level of service comprises a specification of a quantity of the universal infrastructure units guaranteed to the customer, and wherein the maximum number of virtual machines per cluster is determined via calculation of a maximum number of virtual machines that achieve the predefined outage time established as a function of the quantity of universal infrastructure units guaranteed to the customer.

8. The method of claim 7 wherein the predefined outage time is calculated as a function of the quantity of universal infrastructure units guaranteed to the customer divided by at least one of migration time per virtual machine and high availability time per virtual machine.

9. The method of claim 6 wherein guaranteed levels of service are provided for each predefined resource limit value from the set of predefined resource limit values.

10. The method of claim 6 wherein a value of the maximum number of virtual machines per cluster corresponds to a quantity of virtual machines set to ensure an appropriate speed for at least one of high availability restart and maintenance migration.

11. The method of claim 1 wherein migrating the one or more virtual machines executing the one or more workloads of the customer comprises providing room for a busy service within one or more of the plurality of clusters from which the one or more virtual machines executing the one or more workloads of the customer are to be migrated.

12. The method of claim 1 wherein migrating the one or more virtual machines executing the one or more workloads of the customer comprises determining that one or more of the plurality of clusters to which the one or more virtual machines executing the one or more workloads of the customer are to be migrated have sufficient free space to handle operation of the one or more workloads of the customer.

13. The method of claim 1 wherein migrating the one or more virtual machines executing the one or more workloads of the customer is based at least in part on a customer specific migration decision process that evaluates migration requirements, defines a best fit resolution plan, and performs processing to enact the best fit resolution plan, wherein the best fit resolution plan includes determination of a best fit of the one or more virtual machines executing the one or more workloads of the customer across one or more hosts of one or more of the plurality of clusters, to yield a specified outage time calculated as a function of infrastructure guarantee to the customer divided by at least one of migration time per virtual machine and high availability time per virtual machine.

14. The method of claim 13 further comprising performing processing to:
determine if any balance issue exists after the customer specific migration decision process has been performed; and
generate a new customer specific migration decision process in response to determining that a balance issue exists.

15. The method of claim 14 wherein the new customer specific migration decision process results in a per customer iterative balance.

16. A method for processing information related to management of a cluster based pool of resources comprising a plurality of clusters wherein each cluster comprises one or more hosts executing one or more virtual machines, the method comprising:
establishing a resource requirement for a customer as a quantity of universal infrastructure units, wherein a universal infrastructure unit is defined as a function of processing speed and virtual machine memory size;
processing information regarding the quantity of universal infrastructure units for the customer, an indication of a number of virtual machines for the customer, and an indication of a maximum number of virtual machines per cluster, the maximum number of virtual machines per cluster being determined via calculation of a maximum number of virtual machines that achieve a guaranteed level of service corresponding to a set of predefined hardware resource limit values;
associating each universal infrastructure unit from the quantity of universal infrastructure units for the customer with hardware resources assigned to the customer, the hardware resources being managed based on the set of predefined hardware resource limit values;
calculating a number of hosts for the customer based on the quantity of universal infrastructure units for the customer, the number of virtual machines for the customer and the maximum number of virtual machines per cluster;
responsive to determining that the number of hosts for the customer exceeds a number of the one or more hosts in at least a threshold number of the plurality of clusters, defining a stretched cluster combining at least two of the plurality of clusters;
distributing, based on the number of hosts for the customer, the virtual machines for the customer among a set of hosts of the stretched cluster such that each of the one or more virtual machines for the customer runs on a unique host from the set of hosts.

17. The method of claim 16 further comprising:
analyzing the plurality of clusters by performing at least one of speed testing and virtual machine memory map sizing of the one or more hosts in each of the plurality of clusters.

18. The method of claim 16 wherein the set of predefined hardware resource limit values comprises a predefined outage time, wherein the guaranteed level of service comprises a specification of a quantity of universal infrastructure units guaranteed to the customer, and wherein the maximum number of virtual machines per cluster is determined via calculation of a maximum number of virtual machines that achieve the predefined outage time established as a function of the quantity of universal infrastructure units guaranteed to the customer.

19. The method of claim 18 wherein the predefined outage time is calculated as a function of the quantity of universal infrastructure units guaranteed to the customer divided by at least one of migration time per virtual machine and high availability time per virtual machine.

20. The method of claim 16 further comprising:
aggregating customer workload attributes; and
sending the aggregated information to a capacity planning engine or process.

* * * * *